(12) United States Patent
Scahill et al.

(10) Patent No.: US 11,196,649 B2
(45) Date of Patent: Dec. 7, 2021

(54) PROCESSING LOCAL AREA NETWORK DIAGNOSTIC DATA

(71) Applicant: BRITISH TELECOMMUNICATIONS PUBLIC LIMITED COMPANY, London (GB)

(72) Inventors: Francis Scahill, London (GB); Simon Ringland, London (GB); Timothy Twell, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 17/250,243

(22) PCT Filed: Jun. 21, 2019

(86) PCT No.: PCT/EP2019/066511
§ 371 (c)(1),
(2) Date: Dec. 21, 2020

(87) PCT Pub. No.: WO2020/002158
PCT Pub. Date: Jan. 2, 2020

(65) Prior Publication Data
US 2021/0119889 A1    Apr. 22, 2021

(30) Foreign Application Priority Data
Jun. 25, 2018  (EP) ..................................... 18179575

(51) Int. Cl.
*H04L 12/26*    (2006.01)
(52) U.S. Cl.
CPC .............. *H04L 43/04* (2013.01); *H04L 43/06* (2013.01); *H04L 43/0817* (2013.01); *H04L 43/106* (2013.01)

(58) Field of Classification Search
CPC ..... H04L 43/04; H04L 43/06; H04L 43/0817; H04L 43/106
See application file for complete search history.

(56) References Cited

U.S. PATENT DOCUMENTS 6,041,351 A * 3/2000 Kho ........................ H04L 29/06
709/219
7,460,476 B1  12/2008 Morris et al.
(Continued)

FOREIGN PATENT DOCUMENTS

CN  107409071 A  11/2017
CN  112335203 A  2/2021
(Continued)

OTHER PUBLICATIONS

Extended Search Report for European Application No. 19200631.0 dated Jan. 22, 2020, 10 pages.
(Continued)

*Primary Examiner* — Jerry B Dennison
(74) *Attorney, Agent, or Firm* — Patterson Thuente Pedersen, P.A.

(57) ABSTRACT

Methods and apparatus are disclosed for processing local area network diagnostic data obtained in respect of a local area network (LAN). The method includes identifying, from local area network diagnostic data obtained in respect of the LAN, a set of data units including a first and an associated second data unit having a predetermined relationship; updating the first data unit of the set to include an indication that the associated second data unit of the set has been identified; and sending the updated first data unit without the associated second data unit from the LAN for performance analysis at a remote network diagnostic device outside the LAN.

14 Claims, 4 Drawing Sheets

CTS and ACK Removal and Regeneration

(56) References Cited

U.S. PATENT DOCUMENTS

| | | | | |
|---|---|---|---|---|
| 8,874,741 | B2* | 10/2014 | Hassan | H04L 63/20 709/225 |
| 9,300,599 | B2 | 3/2016 | Pope et al. | |
| 10,757,228 | B1* | 8/2020 | Bhimavarapu | H04L 69/18 |
| 2003/0145076 | A1 | 7/2003 | Procopio et al. | |
| 2004/0221132 | A1 | 11/2004 | Torkelsson et al. | |
| 2007/0189174 | A1* | 8/2007 | Hibbert | H04L 43/026 370/241 |
| 2007/0189176 | A1 | 8/2007 | Milne et al. | |
| 2008/0089357 | A1 | 4/2008 | Park et al. | |
| 2009/0281984 | A1 | 11/2009 | Black | |
| 2011/0125898 | A1 | 5/2011 | Hassan et al. | |
| 2014/0040464 | A1 | 2/2014 | Singhal et al. | |
| 2014/0233564 | A1 | 8/2014 | Lue et al. | |
| 2015/0237179 | A1 | 8/2015 | Sridhar et al. | |
| 2015/0289152 | A1* | 10/2015 | Shanmugam | H04L 43/50 455/425 |
| 2016/0149788 | A1 | 5/2016 | Zhang et al. | |
| 2016/0197832 | A1 | 7/2016 | Barry et al. | |
| 2016/0212031 | A1* | 7/2016 | Jain | H04L 43/0894 |
| 2016/0309345 | A1* | 10/2016 | Tehrani | H04W 72/0426 |
| 2017/0063886 | A1 | 3/2017 | Muddu et al. | |
| 2017/0099197 | A1 | 4/2017 | Raney | |
| 2017/0250889 | A1* | 8/2017 | Vogt | H04L 43/04 |
| 2017/0359735 | A1* | 12/2017 | Jain | H04W 24/10 |
| 2018/0337859 | A1 | 11/2018 | Meilik et al. | |
| 2019/0132756 | A1* | 5/2019 | Okada | H04L 43/16 |
| 2019/0259226 | A1* | 8/2019 | Khalifeh | G06Q 50/30 |
| 2020/0304397 | A1* | 9/2020 | Smith | H04L 43/0817 |
| 2020/0322826 | A1* | 10/2020 | Wangler | H04L 43/50 |
| 2020/0344129 | A1* | 10/2020 | Hild | H04L 43/045 |
| 2021/0119889 | A1* | 4/2021 | Scahill | H04L 43/106 |

FOREIGN PATENT DOCUMENTS

| | | |
|---|---|---|
| EP | 1180871 A3 | 4/2005 |
| EP | 1180871 B1 | 11/2007 |
| EP | 2784984 A1 | 10/2014 |
| EP | 2801937 A1 | 11/2014 |
| GB | 2527607 B | 10/2016 |
| GB | 2575246 A | 1/2020 |
| WO | WO-2012175132 A1 | 12/2012 |
| WO | WO-2016123383 A2 | 8/2016 |
| WO | WO-2016123383 A3 | 9/2016 |
| WO | WO-2017112260 A1 | 6/2017 |

OTHER PUBLICATIONS

Goldschneider J R., "Lossy Compression of Scientific Data via Wavelets and Vector Quantization," 1997, 204 pages.
Gupta P., "Algorithms for Packet Classification," 29 pages.
GZIP "GNU GZIP: General file (de)compression," Jan. 2018, retrieved https://www.gnu.org/software/gzip/maunal/gzip.html, retrieved on Mar. 28, 2018, 8 pages.
International Search Report and Written Opinion for Application No. PCT/EP2019/066511, dated Aug. 5, 2019, 14 pages.
International Search Report and Written Opinion for Application No. PCT/EP2019/066513, dated Aug. 5, 2019, 16 pages.
Search Report for GB Application No. 1914094.6, dated Jul. 3, 2020, 4 pages.
Seytnazarov S., et al., "Qos-aware adaptive MPDU aggregation of VoIP traffic on IEEE 802.11n WLANs," Nov. 17, 2014, 4 pages.
Examination Report under section 18(3) for GB Application No. GB1810384.6, dated Dec. 10, 2020, 4 pages.
Hansch G., et al., "Packet-wise compression and forwarding of industrial network captures," Sep. 21, 2017, 9th IEEE International Conference on Intelligent Data Acquisition and Advanced Computing Systems: Technology and Applications, published on Nov. 7, 2017, 5 pages.
International Search Report and Written Opinion for Application No. PCT/EP2020/075775, dated Dec. 7, 2020, 13 pages.
Office Action for Chinese Application No. 201980042025.9 dated May 20, 2021, 10 pages.

* cited by examiner

| Frame Type | Type | Total Frames | Total Bytes | Ave. Size |
|---|---|---|---|---|
| Management | 0 | 2,298,526 | 1,064,416,183 | 463 |
| Control | 1 | 12,477,202 | 778,632,341 | 62 |
| Data | 2 | 6,570,621 | 4,363,430,097 | 664 |
| Total | - | 21,346,349 | 6,206,478,524 | - |

Figure 2: Table of Different Frame Types

| Control Frame Subtype | Type/ Subtype | Total Frames | Total Bytes | Ave. Size |
|---|---|---|---|---|
| ACK | 0x1d | 2,608,517 | 148,685,469 | - |
| RTS | 0x1b | 2,819,733 | 177,643,179 | 63 |
| CTS | 0x1c | 3,954,517 | 225,407,469 | 57 |
| BlockAckReq | 0x18 | 3,236 | 216,812 | - |
| BlockAck | 0x19 | 2,550,989 | 191,324,175 | - |
| PS-Poll | 0x1a | 99,541 | 6,721,083 | - |
| VHT NDP Announcement | 0x15 | 440,669 | 29,084,154 | 66 |
| Others | - | 0 | 0 | - |
| Total | - | 12,477,202 | 778,632,341 | - |

Figure 3: Table of Different Subtypes of Control Frame

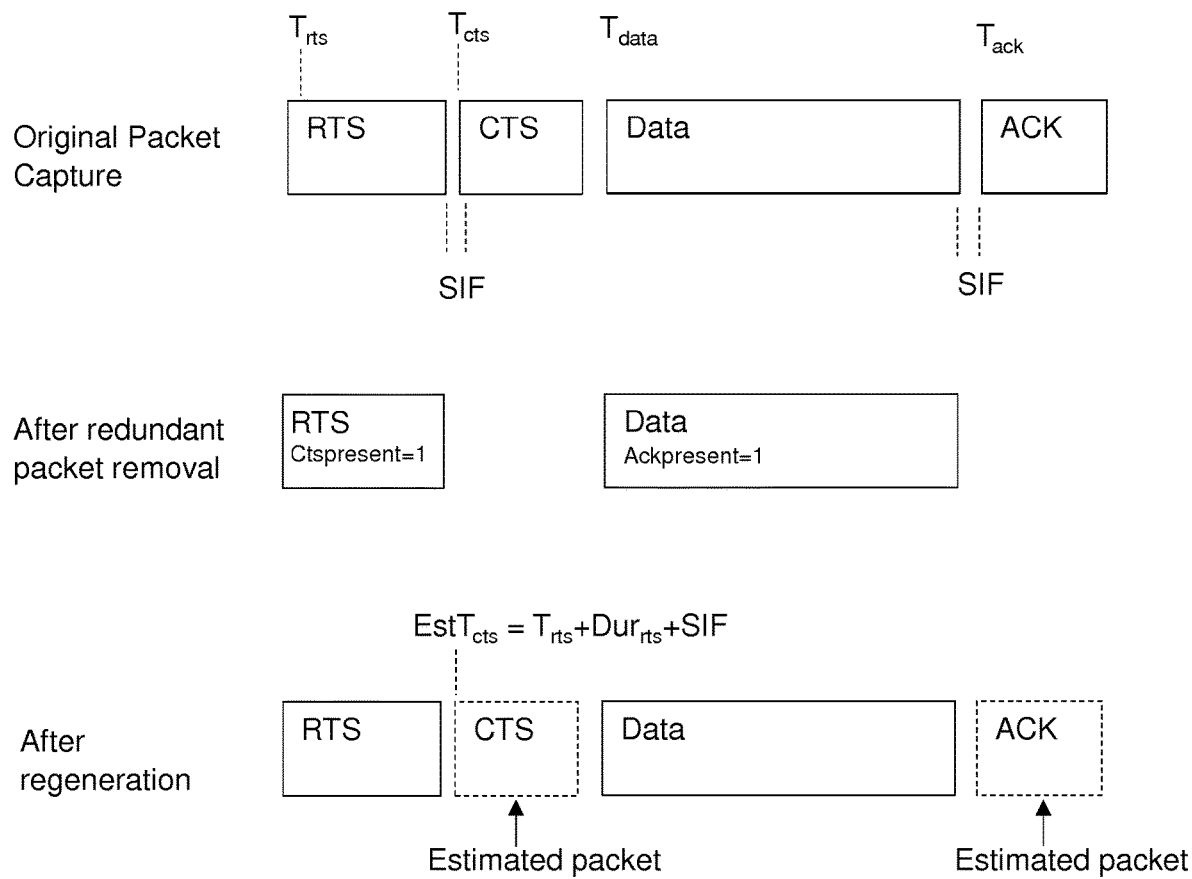
Figure 4: CTS and ACK Removal and Regeneration

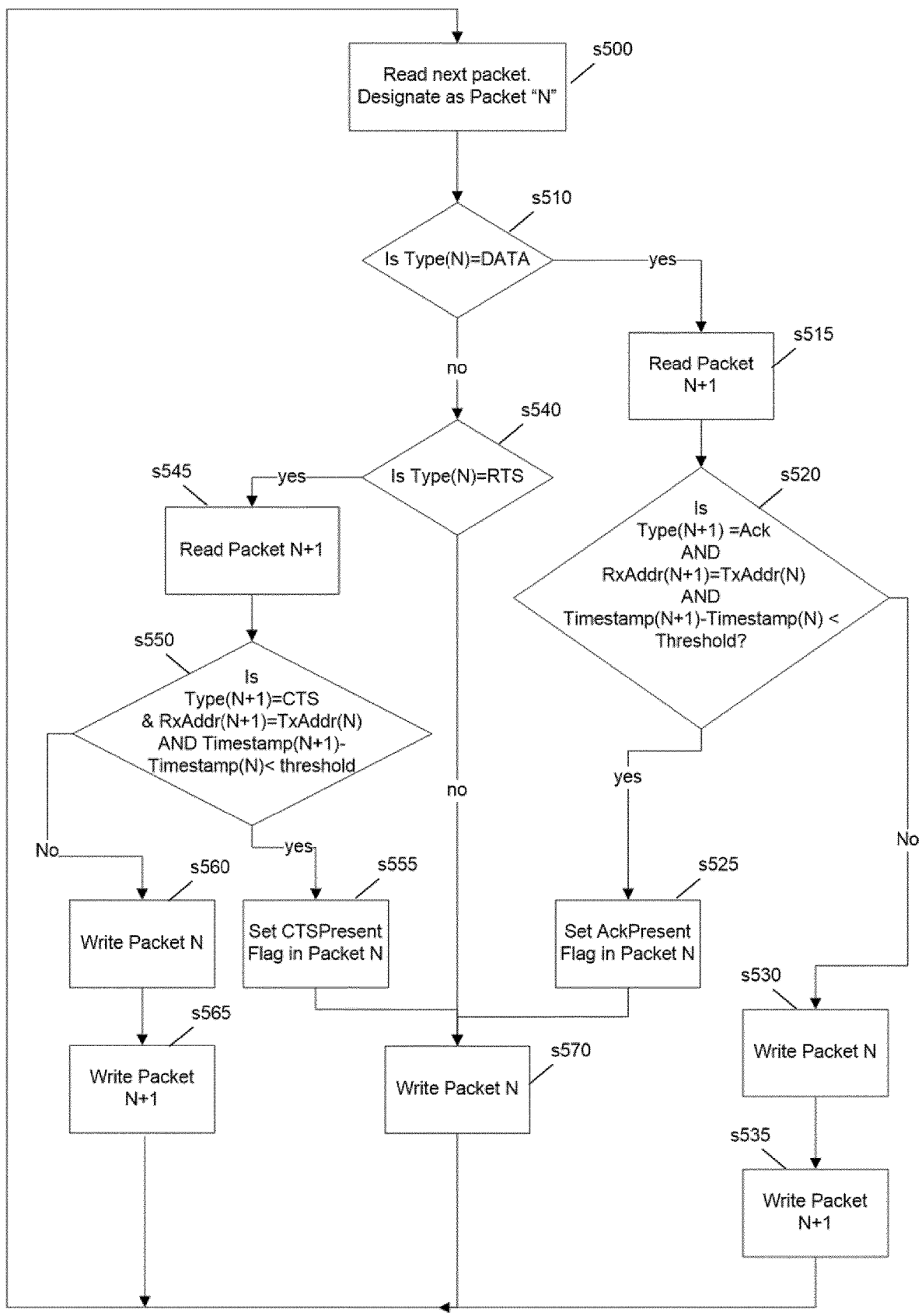
Figure 5: Process Flow-Chart

PROCESSING LOCAL AREA NETWORK DIAGNOSTIC DATA

PRIORITY CLAIM

The present application is a National Phase entry of PCT Application No. PCT/EP2019/066511, filed Jun. 21, 2019, which claims priority from EP Patent Application No. 18179575.8, filed Jun. 24, 2018, each of which is hereby fully incorporated herein by reference.

TECHNICAL FIELD

The present disclosure relates to methods of and systems for processing local area network diagnostic data obtained in respect of a local area network. In particular, some embodiments of the disclosure relate to techniques and apparatus for use in relation to the uploading of such diagnostic data from a local area network to (for example) an Internet Service Provider for subsequent analysis, network diagnostics and other such processing.

BACKGROUND

In network diagnostics systems that rely on capturing and analyzing every packet transmitted over a network, the amount of storage, bandwidth and processing required is dependent on both the number of packets captured and the average size of a packet. It is advantageous therefore to reduce both the number of packets and the size of the packets that are captured and processed.

It is common in packet capture or data transmission systems to use compression algorithms such as GZIP compression (discussed later) to reduce the size of packet captures. Compression can be applied on a packet-by-packet basis or across a block of multiple packets depending on the acceptable delay and the desired compression ratio required. GZIP-based packet compression has the advantage of being a lossless compression scheme and ensures that all packets can be recreated perfectly when decompressed, however this limits the maximum amount of compression that is possible.

In IEEE 802.11 based WiFi systems, packet captures often contain frames with unique timestamps and frame sequence numbers although the packets themselves often convey little useful diagnostic information other than their presence. The unique frame timestamps and sequence numbers within the standard packet capture files generally reduce the amount of compression that is possible for the frames, however. Often these packets must occur within a given time delay relative to other packets in the file meaning that it is not necessary to store their exact timestamp since this can be inferred from its related packet. Examples of these packets within IEEE 802.11 protocols are "Acknowledgement" ("ACK") and "Clear to Send" ("CTS") packets, which generally must occur within 10 μsec (i.e. 10 microseconds) of their associated "Data" or "Request to Send" ("RTS") packet. Such packets may account for more than 50% of all packets within a packet capture file, though their small packet size may mean that they may only account for 15% of the overall packet capture file size.

Whilst the size of a packet capture file affects the amount of storage and bandwidth required to upload the capture, it is (at least primarily) the number of packets within a packet capture that determines how much CPU processing power is required to analyze the packet capture, so it is still advantageous to remove small packets even if this does not make a significant difference to the compressed packet capture file size.

It will be appreciated that the data units in question will generally be regarded as frames in relation to their transfer at Layer 2 according to the OSI Model, and as packets in relation to their transfer at Layer 3, but since the frames in question are encapsulated within packets in order for the data in question to be uploaded as part of a packet capture, the issues above are applicable whether the data units in question are regarded as being frames or packets, in particular since the number and sizes of the packets in a packet capture will depend to a large extent on the number and sizes of the frames they carry.

Referring now to some existing techniques, GZIP (referred to earlier) is a file format and software application which is used for file compression and decompression. Briefly, GZIP compression uses Liv-Zempel (LZ) compression to replace identical byte sequences in data with a single instance, and is therefore able to compress data very efficiently. LZ algorithms achieve compression by replacing repeated occurrences of data with references to a single copy of that data existing earlier in the uncompressed data stream. A match is encoded by a pair of numbers called a "length-distance pair", which is equivalent to the statement "each of the next [length] characters is equal to the characters exactly [distance] characters behind it in the uncompressed stream". The longer the byte sequences that can be replaced, the more efficient the compression can be.

ZIP compression is a lossless compression technique however, and does not take account of insignificant differences between byte sequences (e.g. fields within packet contents having similar but non-identical values, or fields where the value is variable but unimportant are not compressed). Also, while ZIP-compression can generally reduce the size of packet captures, it does not generally reduce the number of packets after decompression since each packet generally has at least a unique packet number and/or timestamp, so GZIP compression does not necessarily reduce the processing requirements of back-end analytics systems.

More information about GZIP is available online on a web-page entitled "GNU Gzip" available at www.gnu.org and elsewhere.

"Wireshark" provides a data capturing technique that "understands" the structure (i.e. the encapsulation) of various networking protocols. It can parse and display the fields, along with their meanings as specified by different networking protocols. Wireshark uses the "pcap" (packet capture) application programming interface (API) to capture packets, so can only capture packets on the types of networks that "pcap" supports.

Within Wireshark, the "Editcap" functionality is capable of removing duplicate packets ("Packet Deduplication") in a packet capture. To identify identical packets, Wireshark generates a hash value based on the packet contents and stores the historical hash values for a configurable historical window defined either by absolute time or by number of packets. If the current packet hash is the same as the hash for any previous packets within the window then the current packet is dropped. The packet hash function can be configured to ignore a fixed number of bytes from the start of the packet, but this number is the same for all packet types and is a prefix only. Typically this is to allow timestamps and/or frame numbers to be ignored when calculating the packet hash. However the same fixed number of bytes are ignored from all packets. Further, the duplicate packet is removed in Wireshark, and no record is retained of this packet, meaning it cannot be reinstated afterwards even if needed.

A paper by Pankaj Gupta and Nick McKeown entitled "Algorithms for Packet Classification" (IEEE Network: Magazine of Global Internetworking, Vol 15, Issue 2, March 2001, pages 24-32) available online at www.yuba.stanford.edu describes packet classification techniques which are used to group packets into semantically similar classes to allow class-specific processing such as traffic-shaping or identification to be applied to the packet. Packet classifiers may use different subsets of the packet fields dependent on the packet type to match a packet to various classes, i.e. a packet classifier may define a similarity measure by which a packet may be compared to other packets.

A paper by Jill R. Goldschneider entitled "Lossy Compression of Scientific Data via Wavelets and Vector Quantization" (February 2000), which is available online at www.digitial.lib.washington.edu discusses lossy compression for data transmission. In Vector Quantization (VQ) based data compression the packet payloads are replaced with the index of the nearest codebook entry. The VQ algorithm uses a distance/similarity measure to compare payload contents in order to find the nearest codebook entry. Typically a single distance metric is applied to all the payload contents. In a VQ system the codebook is typically predefined and is not dynamically generated from the content, and the system relies on the payloads typically being fixed dimensionality data of a single type (e.g. speech data, image data or sensor data).

Referring now to prior patent documents, European application EP2801937A1 ("Rockwell") relates to an industrial attestation service executing on a cloud platform. This collects industrial data from multiple levels of an industrial enterprise and identifies subsets of the industrial data that characterize normal operation. In the cloud platform, baselines are generated for diverse aspects of the industrial enterprise based on the identified subsets, where the baselines characterize normal operation. The baselines are used as a reference in connection with device and system attestation. Aspects of the industrial enterprise that deviate from their corresponding baselines are identified in the cloud platform. Attestation reports indicating aspects of the enterprise that have altered relative to their baselines are delivered to client devices via the cloud platform.

SUMMARY

As explained earlier, it is common in packet capture or data transmission systems to use compression algorithms such as GZIP compression to reduce the size of packet captures, GZIP-based packet compression being a lossless compression scheme which ensures that all packets can be recreated perfectly when decompressed. In a network diagnostics system, however (as opposed to a communication system), it is not necessarily important to have a lossless version of the original packet capture since the diagnostics and analysis may depend only on subsets of the packet fields which are relevant to the diagnostic analysis. The present inventors have therefore identified an opportunity to exploit this redundant information to reduce the size and/or number of packets in a packet capture used for diagnostic purposes by using lossy compression techniques to improve the level of compression possible.

Aspects and embodiments of the disclosure relate to techniques and apparatus for uploading Local Area Network (LAN) diagnostic data (often referred to as network Packet CAPtures or "PCAPs") from a LAN to (for example) an Internet Service Provider (ISP) for analysis, network diagnostics and other such processing. The uploading of such diagnostic data is generally done via or from a LAN gateway device (such as a LAN router/modem device or "Home Hub"), which is located topologically at the boundary of the LAN, and serves as the entry/exit point for data entering/exiting the LAN.

In particular, some embodiments of the disclosure are concerned with the issue of how to reduce the size of network packet captures or other such diagnostic data that are to be uploaded for analysis by an ISP or party acting on behalf of an ISP, possibly using a cloud server. Such packet captures can be large, with high bandwidth and storage requirements, so it is advantageous to use compression before uploading them.

While the data to be uploaded generally includes a significant proportion of packets that are not generally relevant to the subsequent diagnostic analysis, standard PCAP analysis techniques generally require uploaded data to be in a standard format, so "expect" such "redundant" packets (i.e. those not relevant for the purpose of diagnostic analysis) to be present (essentially, proper functioning of the analysis technique relies on their presence).

According to a first aspect of the disclosure, there is provided a method of processing local area network diagnostic data obtained in respect of a local area network, the local area network having at least one user-device located therein operable to communicate via a local area network gateway device with one or more remote devices in a communications network outside the local area network, the local area network diagnostic data comprising one or more sets of data units carrying data relating to performance characteristics in respect of communication between the local area network gateway device and the at least one user-device located in the local area network, each set of data units comprising at least a first and an associated second data unit having a predetermined relationship, the method comprising: identifying, from said local area network diagnostic data obtained in respect of the local area network, a set of data units comprising a first and an associated second data unit having a predetermined relationship; updating the first data unit of the set to include an indication that the associated second data unit of the set has been identified; and sending the updated first data unit without the associated second data unit from the local area network for local area network performance analysis at a remote network diagnostic device in the communications network outside the local area network.

According to some embodiments, the local area network diagnostic data obtained in respect of the local area network may comprise a plurality of packets conforming to a predetermined version of a network protocol, which may be a predetermined wireless networking protocol.

According to some embodiments, the local area network diagnostic data obtained in respect of the local area network may comprise one or more of the following:
- at least one Request-To-Send (RTS) packet and at least one associated Clear-To-Send (CTS) packet;
- at least one Data packet and at least one associated Acknowledgement (ACK) packet;
- at least one Management packet and at least one associated ACK packet.

In such embodiments, any of the following pairs of data units may be identified as being a "set" of data units:
- an RTS packet and an associated CTS packet:
- a Data packet and an associated ACK packet:
- a Management packet and an associated ACK packet.

Other types of sets may also be identified, each type having a predetermined relationship.

While a "set" of data units must comprise at least two data units (i.e. a first and an associated second data unit having a predetermined relationship), in some scenarios a set may have more than two data units. It may for example comprise a first data unit and associated second and third data units, each having a predetermined relationship with the first. In such embodiments, the first data unit of the set may be updated to include an indication that the second and third data units of the set have been identified, and the updated first data unit may be sent without the associated second and third data units for performance analysis.

According to some embodiments, the local area network diagnostic data may comprise a plurality of sets of data units carrying data relating to performance characteristics of the local area network, each set of data units comprising at least a first and an associated second data unit having a predetermined relationship. Such a plurality of sets of data units may be referred to as a "packet capture". A packet capture may include sets of data units of different types such as those set out above, each type of set having its own predetermined relationship.

According to such embodiments, the method may comprise identifying from said local area network diagnostic data a plurality of sets of data units, each set comprising a first and an associated second data unit having a predetermined relationship; updating the first data unit of each set to include an indication that the associated second data unit of the set has been identified; and sending updated local area network diagnostic data from the local area network for local area network performance analysis at a remote network diagnostic device in the communications network outside the local area network, the updated local area network diagnostic data comprising the updated first data unit of each set without the associated second data unit of the set. By virtue of this, the method may be performed in respect of a "packet capture" comprising a plurality of sets of data units or one or more types.

According to some embodiments, said data units may include respective time indications (such as Timestamps) and may be identified as comprising a set of data units in dependence on their respective time indications. The predetermined relationship in respect of sets of such data units may thus be (or be dependent on) a relationship such as a (time-difference) between their respective time indications.

According to some embodiments, said data units may include respective indications of "type" and may be identified as comprising a "set" of data units in dependence on their respective indications of type. The predetermined relationship in respect of sets of such data units may thus be (or be dependent on) a relationship between their respective indications of type. It may take account of this as well as one or more other factors, such as the respective time indications of the data units.

According to some embodiments, the method may further comprise receiving the updated first data unit at the remote network diagnostic device; inspecting the updated first data unit; and in response to identifying the indication therein that the associated second data unit of the set has been identified, generating a data unit corresponding to the associated second data unit. In such embodiments, the method may further comprise performing local area network performance analysis at said remote network diagnostic device in dependence on the received first data unit and on the generated data unit corresponding to the associated second data unit.

According to a second aspect of the disclosure, there is provided apparatus for processing local area network diagnostic data obtained in respect of a local area network, the local area network having at least one user-device located therein operable to communicate via a local area network gateway device with one or more remote devices in a communications network outside the local area network, the local area network diagnostic data comprising one or more sets of data units carrying data relating to performance characteristics in respect of communication between the local area network gateway device and the at least one user-device located in the local area network, each set of data units comprising at least a first and an associated second data unit having a predetermined relationship, the apparatus comprising one or more processors configured to: identify, from said local area network diagnostic data obtained in respect of the local area network, a set of data units comprising a first and an associated second data unit having a predetermined relationship; update the first data unit of the set to include an indication that the associated second data unit of the set has been identified; and send the updated first data unit without the associated second data unit from the local area network for local area network performance analysis at a remote network diagnostic device in the communications network outside the local area network.

Such apparatus may comprise one or more modules in or associated with the local area network gateway device.

According to a third aspect of the disclosure, there is provided a computer program element comprising computer program code to, when loaded into a computer system and executed thereon, cause the computer to perform the method according to the first aspect.

The various options and embodiments referred to above in relation to the first aspect are also applicable in relation to the second and third aspects.

Embodiments of the disclosure address a desire to reduce the size of network packet captures that are collected at endpoints and uploaded to cloud servers for analysis and network diagnostics. Such packet captures can be large and require significant bandwidth and storage requirements. Whilst standard compression algorithms and utilities such as Linux GZIP can be used to compress such packet captures these files can still be 100 MBs per day after compression. In some scenarios, limitations in respect of local storage and possibly low broadband speed can make it particularly advantageous to reduce the size of packet captures.

Embodiments of the disclosure provide a 'lossy' compression scheme which enables packet captures to be compressed at high compression ratios by removing redundant packets, but alters fields in other packets in such a way as to enable the removed packets to be regenerated after uploading from the LAN, thereby enabling the PCAP data to be processed using standard techniques that "expect" full, standard PCAP file formats.

Embodiments of the disclosure address a desire to reduce the storage, transmission bandwidth and computing resources needed to capture, store and process network packet captures used for network diagnostics. They use a lossy packet compression scheme which exploits knowledge of the network protocols of the packets being captured, and knowledge of the type of network diagnostic analysis to be performed, to:

(a) Remove redundant packets completely whilst still ensuring that these packets can be recreated later if necessary; and (b) Allow redundant packet fields to be removed/replaced to enable higher degrees of compression.

A primary goal is to reduce the number of packets from the captures prior to upload whilst retaining the ability to generate the same diagnostic results as if those packets were included and importantly to be able to regenerate a packet capture with packets corresponding to all the original packets present, albeit with some of these packets containing field values that differ from the original packets (albeit only in insignificant features, fields or ways).

This is advantageous because these packet captures may be used by other users and/or software systems which may depend on the packet capture files appearing as if all packets had remained explicitly present within the packet capture.

Embodiments of the disclosure include a number of mechanisms that exploit knowledge of the operation of specific network protocols such as 802.11 WiFi combined with knowledge of the type of information required by for example WiFi diagnostics systems to enable much higher degrees of packet capture compression than are generally possible with standard compression techniques.

In some packet-based diagnostic systems it is necessary for ISPs to collect packet captures on remote endpoints such as router/modem or "home-hub" type devices. These endpoints may have limited storage, and may be connected via links of various (and possibly variable) quality levels ranging from ADSL through to FTTP connections. Reducing the storage and bandwidth requirement on the endpoints can reduce the cost of deploying packet-based diagnostic systems. Also, where large numbers of endpoints are connecting to a cloud-based diagnostic platform, reducing bandwidth requirements for the upload of packet captures can have substantial cost benefits in terms of the cost and capacity of network links and data-center equipment needed.

BRIEF DESCRIPTION OF THE DRAWINGS

Embodiments of the disclosure will now be described with reference to the appended drawings, in which:

FIG. 2 is a table showing by way of example information in respect of three different frame types.

FIG. 3 is a table showing information in respect of various different subtypes of one type of frame, namely the control frames referred to in FIG. 2.

FIG. 4 illustrates the process of removal and regeneration of packets, using the example of "Clear to Send" ("CTS") and "Acknowledgement" ("ACK") packets.

FIG. 5 is a flow-chart illustrating a possible process for the removal of "CTS" and "Acknowledgement" ("ACK") packets according to one embodiment, such that they can be regenerated after a packet capture has been uploaded from a Local Area Network.

DETAILED DESCRIPTION

With reference to the accompanying figures, methods and apparatus according to various embodiments will be described.

Figure 1:
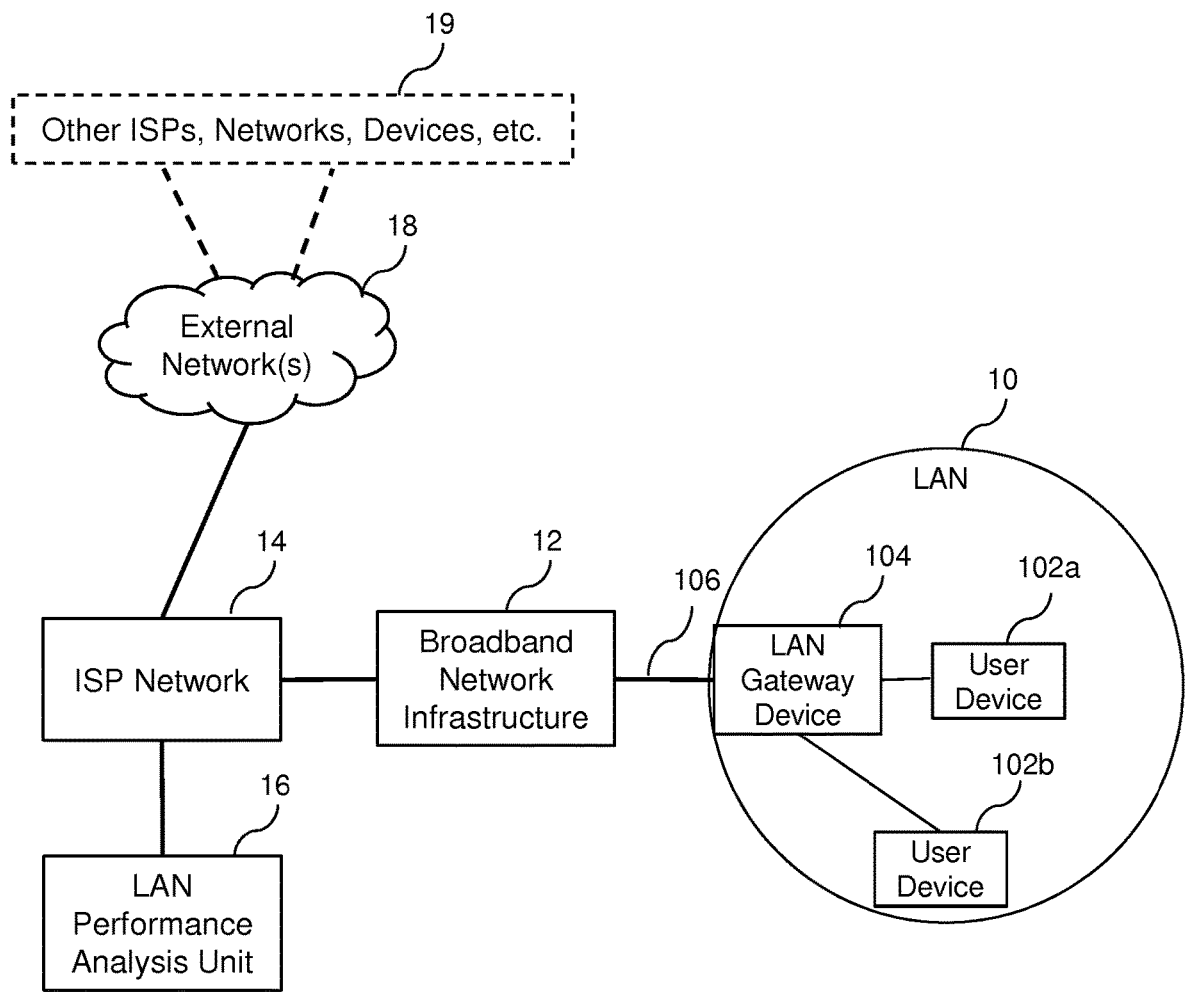
FIG. 1 shows a Local Area Network and entities and other networks with which devices in such a Local Area Network may communicate.

Referring first to FIG. 1, this shows a Local Area Network (LAN) 10 within which are one or more user devices 102a, 102b such as computers, smart-phones, internet-enabled televisions etc. (generally 102) and a LAN gateway device 104, which may comprise a LAN router/modem device or "Home Hub" and/or other Network Termination Equipment (NTE). The user devices 102 may communicate via wired or wireless connections with the LAN gateway device 104, but in the present example, the LAN gateway device 104 is also capable of operating as the wireless hub of a wireless LAN. The LAN gateway device 104 is located topologically at the boundary of the LAN 10, and serves as the entry/exit point for data entering/exiting the LAN when a user device 102 within the LAN communicates with a device in a network outside the LAN.

In the present example, the LAN gateway device 104 is in communication via a connection 106 with broadband network infrastructure 12. The connection 106 may for example be a Dynamic Subscriber Line (DSL) connection over a public switched telephone network (PSTN) line or otherwise, in which case the broadband network infrastructure 12 may include a Digital Subscriber Line Access Multiplexer (DSLAM) with an associated element manager allowing the performance of the DSL connection to be monitored and adjusted by way of Dynamic Line Management (DLM) techniques. Alternatively, the connection 106 may be a fiber connection, or otherwise.

In the present example, irrespective of the type of broadband connection, the broadband network infrastructure 12 is generally in communication with an Internet Service Provider (ISP) network 14, via which a user device 102 in the LAN 10 (and other devices in the ISP network 14) may communicate via one or more other external networks 18 (e.g., the Internet) with servers and other devices 19 in other networks (e.g. other ISP networks, etc.). In an alternative example, the network in question may be a corporate network, possibly across multiple sites, in which case the network infrastructure via which the individual sites are in communication with each other and/or with external networks 18 and other devices 19 (including a LAN performance analysis unit 16, to be discussed below) may be a corporate Wide Area Network (WAN) or similar, for example, rather than the broadband network infrastructure 12 and ISP network 14 shown in FIG. 1.

Also shown in FIG. 1 is a LAN performance analysis unit 16. This is shown as being in communication with the ISP network 14, but it may in fact be within the ISP network 14, or located elsewhere. It may be under the control of the ISP, but may alternatively be a separate entity in communication therewith or otherwise in communication with the LAN gateway device 104 in the LAN 10. A primary role of the LAN performance analysis unit 16 is to receive diagnostic data obtained in respect of one or more LANs such as LAN 10, generally in the form of packet captures, and carry out performance and/or other diagnostic analysis and/or other processing in respect of the LAN diagnostic data.

As explained earlier, the size of a packet capture affects the amount of storage and bandwidth required to upload the packet capture to the ISP or to whichever entity is to receive and process the diagnostic data therein, so it is advantageous if the size of the packet capture (measured in bytes, for example) can be reduced prior to the packet capture being sent from the LAN gateway device 104 (or other device in the LAN 10) to the ISP or other such processing entity, provided this can be done in such a way as to preserve the "relevant" information contained in the packet capture (i.e. information of relevance to any subsequent diagnostic analysis), ideally preserving it in a form that allows the necessary processing to be performed using standard performance analysis techniques.

As well as the size of the packet capture affecting the amount of storage and bandwidth required to upload the packet capture, the number of packets within a packet capture is also significant, as it is a significant factor in determining how much CPU processing power is required to analyze and otherwise process the packet capture, so it is in fact advantageous to remove small (i.e. in terms of number of bytes) packets even if this does not make a significant different to the compressed packet capture file size.

Referring next to FIG. 2, this is a table showing, by way of example for three different frame types (namely "Management", "Control" and "Data"), the total number of frames of each type in a typical day, the total bytes used for the frames of each type, and the average frame-size in bytes. As can be seen from this, in a typical WiFi environment, control frames may account for over 50% of all frames in a typical day (and a corresponding percentage of packets in each individual packet capture).

FIG. 3 is a table showing information in respect of the various different subtypes of the control frames referred to in FIG. 2. The sub-types listed are "Acknowledgement" ("ACK") packets, "Request to Send" ("RTS") packets, "Clear to Send" ("CTS") packets, "Block Acknowledgement Request" ("BlockAckReq") packets, "Block Acknowledgement" ("BlockAck") packets, "Power Save Poll" ("PS-Poll") frames, "Very High Throughput ("VHT") Null Data Packet ("NDP") Announcement" frames, and "others". Similarly to the table in FIG. 2, FIG. 3 shows, for these subtypes, the total number of frames of each subtype in a typical day, the total bytes used for the frames of each subtype, and (where applicable) the average frame-size in bytes. This table indicates (by way of example) that of the control frames referred to in FIG. 2, packets such as "ACK" and CTS" packets (which may be deemed "redundant" for the purposes of diagnostic analysis) may make up about 52% of the control frames and 30% of all frames within the packet capture, although due to their small average size they may account for only about 6% of all data in a packet capture.

Redundant Packet Removal

According to some embodiments, these "redundant" packets are removed from a packet capture before the (revised, reduced) packet capture is uploaded from the Local Area Network (LAN) (i.e. generally from the LAN gateway device such as a LAN router/modem device or "Home Hub", which is generally located topologically at the boundary of the LAN and serves as the entry/exit point for data entering/ exiting the LAN) to an Internet Service Provider (ISP) or other entity for analysis, network diagnostics and other such processing. The removed packets are preferably replaced with (or reflected by) a value in an earlier packet which is used to indicate that the later packet was previously present (although in alternative embodiments, it may be possible for the redundant packets to be replaced with (or reflected by) a value in a later packet which indicates that an earlier (redundant) packet was previously present in the packet capture). This may be possible where the sets involved are RTS and CTS, for example, as both contain the required information, so either can be removed and referred to in the other in accordance with the described method.

This technique makes use of a capability to infer the contents of the removed packet and its position and timing based on one or more other packets that remain in the packet capture and are therefore present in the (revised, reduced) packet capture that is then uploaded from the LAN.

In general, and with reference again to FIG. 1 in particular, methods according to embodiments of the disclosure involve processing of diagnostic data obtained in respect of a local area network such as LAN 10, the LAN having at least one user-device such as user device 102a which is able to communicate via a LAN gateway device 104 (such as a router/modem device or "Home Hub") with other devices 19 outside the LAN. The processing, which is generally performed prior to the uploading of the diagnostic data to a remotely-located performance analysis unit 16 for subsequent analysis (generally by or on behalf of an ISP) may be performed by the LAN gateway device 104 or by an associated device. The diagnostic data to be processed may be in the form of standard packet captures, and comprises data which can be partitioned into sets of data units carrying data relating to performance characteristics of the LAN, each set of data units comprising at least a first and an associated second data unit having a predetermined relationship. The processing method performed by the LAN gateway device 104 or otherwise comprises identifying, from the diagnostic data obtained in respect of the LAN 10, a set of data units comprising a first and an associated second data unit having the predetermined relationship in question.

As indicated earlier, examples of possible "sets" for the purposes of identifying associated packets include an RTS packet and its associated CTS packet, a Data or Management packet and its associated "ACK". Depending on which type/types of set is/are to be identified, the LAN gateway device 104 will identify packets as being "associated" (and therefore a "set") based on a predetermined relationship indicative of the type of set in question.

For sets including an RTS packet and its associated CTS packet, or those including a Data or Management packet and its associated "ACK" packet, the predetermined relationship may include the requirement discussed earlier that the respective members of the set must occur within 10 μsec of each other (as well as being packets of the required type and/or having corresponding Receiver and Sender addresses, as will be discussed later), but for sets of other types, the predetermined relationship may include different types of requirements, possibly with longer time-windows than the 10 μsec window generally required in respect of RTS/CTS sets or Data/ACK sets or Management/ACK sets.

Embodiments of the disclosure may be applicable in relation to other types of sets/pairs of data units (i.e. other than "RTS/CTS" pairs, "Data/ACK" pairs, "Management/ACK" pairs, etc.). Another example would be an "Association Request" and a successful "Association Response". A response received within a specified timeout would generally be redundant and removed. The system may be configured only to consider Association Response messages that contain a "success" status as redundant. Responses that contain a "fail" status are not redundant since the status code in this case is significant. This may apply similarly in the case of "Authentication" messages and "Authentication" responses. In both cases the timings would not generally be as strict as for the RTS/CTS and Data/ACK pairs.

Having identified such a set of data units (the type being identified generally determining the predetermined relationship used for the identification), the processing method then comprises updating the "first" data unit of the set to include an indication that the associated "second" data unit of the set has been identified (noting that while the "first data unit" may be the earlier-received of the two, it need not be—the words "first" and "second" need not imply a temporal relationship—they are simply terms allowing each of the data units to be referred to separately). The processing method then comprises sending the updated first data unit (i.e. updated to include the indication that the associated second data unit of the set had been identified) without the associated second data unit from the LAN 10 for performance analysis at a remote network diagnostic device 16 outside the LAN. The second data unit of the set is essentially discarded prior to the uploading of the packet capture, as it does not need to be uploaded when the (revised, shortened) packet capture is uploaded from the LAN.

In the example of a wireless LAN, communications between the LAN gateway device 104 and any wireless-capable user devices 102 will generally be performed according to a protocol within the IEEE 802.11 set of standards, often referred to as "Wi-Fi".

Within IEEE 802.11 network protocols examples of the packets generally present in a packet capture which may be uploaded for LAN diagnostic purposes include the CTS response to an RTS packet and the ACK response to a Data or Management packet, discussed earlier. It is a feature of WiFi protocols that these packets (i.e. the respective CTS and ACK responses to associated RTS and Data or Management packets) will be transmitted at or within a fixed or predetermined delay after their associated packet, this delay being known as the Short Inter-Frame (SIF) Spacing or SIF delay. Other examples are "Beacon" packets, which are essentially identical and are transmitted at fixed intervals, e.g. at 100 ms intervals. (Other network protocols have similarly suitable examples, e.g. SYNACK responses to SYN packets within the TCP protocol.)

For these packets where the associated packet has to be received within a fixed or predetermined time interval and whose contents (or at least the major part thereof) can be inferred from another associated or related packet, the earlier related packet can be modified to include a flag to indicate whether the companion response packet (e.g. the CTS response to an RTS packet, or the ACK response to a Data or Management packet) was seen in the packet capture. Since the CTS and ACK packets/frames will generally only contain information which is already in the previous packet/frame and given that these packets/frames if present have to occur within a particular time delay from the prior packet/frame then these subsequent packets/frames can be recreated at the expected time with very good (e.g. sub-millisecond) accuracy. The contents of the ACK and CTS packets can be re-generated based entirely on the contents of their associated RTS or Data/Management packets, for example. The only content needed in an ACK packet is the receiver address, for example, which is identical to the transmitter address of the previous Data/Management packet. Similarly, CTS packets contain only a receiver address and a "remaining duration" field. Since the remaining duration is the duration within the previous RTS packet minus the duration of the RTS itself, again the packet contents can easily be recreated, based only on the RTS packet and a Boolean operation to say whether the CTS packet was present in the original capture.

FIG. 4 illustrates the process of CTS and/or ACK removal and regeneration. This figure includes in the top section representations of an RTS packet and its associated CTS packet and of a Data packet and its associated ACK packet in an original packet capture, with the respective timestamps $T_{RTS}$, $T_{CTS}$, $T_{data}$, and $T_{ack}$, and the respective SIF delays between the associated packets of the RTS/CTS pair and of the Data/ACK pair. (It will be appreciated that the process shown in FIG. 4 may apply in the same manner in respect of Management/ACK pairs.)

The middle section shows representations of an RTS packet after its associated CTS packet has been identified and removed, and of a Data packet after its associated ACK packet has been removed. In the example of FIG. 4, to indicate that the (removed) CTS packet was seen, currently unused bits of the previous packet (e.g. the "radiotap.rx-flags" field within the associated RTS packet) have been rewritten to indicate that the CTS frame was present in the original packet capture and was within the expected time threshold (i.e. within the SIF delay after the RTS packet). Similarly, to indicate that the (removed) ACK packet was seen, currently unused bits of the previous Data packet have been rewritten to indicate that the ACK packet was present in the original packet capture and was within the expected time threshold (i.e. within the SIF delay after the Data packet).

Note that if a CTS or ACK packet was seen outside of the expected delay, then it can be included in the output. This may happen if the original RTS or Data packet was not captured, or it may indicate a CTS-Self transmission where there was no related RTS packet, for example.

If the removed packet needs to be regenerated after the packet capture has been uploaded to a diagnostic system, the RTS packet and the indication within this (e.g. the "radiotap.rxflags" value) can be used to determine whether or not to re-create the CTS packet, and similarly the Data packet and the indication within this can be used to determine whether or not to re-create the ACK packet. The original timestamp of the CTS (and/or ACK) packet can be estimated based on knowledge of the IEEE 802.11 protocol (i.e. the packet timestamp would have been "RTS timestamp+duration of RTS+IEEE 802.11 SIF delay"). Similarly the contents of a packet with a CTS frame type can be created using the Transmit and Receive address of the associated packet with an RTS frame type and the Duration field contents of the RTS packet. This is illustrated in the lower section of the figure.

FIG. 5 is a flow-chart illustrating a process for the removal of CTS and ACK packets from packet captures according to one embodiment, such that they can be regenerated after a packet capture has been uploaded from a Local Area Network. Such a process may be performed by or on behalf LAN gateway device 104, for example. It will be appreciated that the process may be performed in respect of Management packets (and their associated ACK packets) as well as or instead of Data packets (and their associated ACK packets), and that for sets of data units comprising an RTS and a CTS packet, it may be the RTS packet that is removed rather than the CTS packet, but these options are not shown in the flow-chart in order to avoid unnecessary complexity.

Starting from s500, the first packet (referred to as "Packet N") of a packet capture of local area network diagnostic data obtained in respect of the LAN is read. At s510, it is determined if the packet type of Packet N is "DATA". If so, the process continues to s515, and the next packet ("Packet N+1") is read.

At s520, it is determined if the packet type of Packet N+1 is "ACK" and if the Receive Address of Packet N+1 is the same as the Transmit Address of Packet N and if the difference between the Timestamps of Packet N+1 and Packet N is less than the threshold difference for the packets to be treated as associated "Data" and "ACK" packets. If these three conditions are met, the process continues to s525, at which an "AckPresent" flag is set in Packet N before the process proceeds to s570, at which Packet N (containing the "AckPresent" flag as an indication that its associated "Data" packet has been identified) is written and can be uploaded as part of the updated, shortened packet capture.

If however it is found at s520 that not all three conditions are met, the process continues to s530, at which Packet N (not containing an "AckPresent" flag) is written, then to s535, at which Packet N+1 is written, so that both (unchanged) packets can be uploaded as part of the packet capture.

If it is not found at s510 that the packet type of Packet N is "DATA", the process continues to s540 (rather than s515), and it is instead determined if the packet type of Packet N is "RTS". If so, the process continues to s545, and the next packet ("Packet N+1") is read.

At s550, it is determined if the packet type of Packet N+1 is "CTS" and if the Receive Address of Packet N+1 is the same as the Transmit Address of Packet N and if the difference between the Timestamps of Packet N+1 and Packet N is less than the threshold difference for the packets to be treated as associated "RTS" and "CTS" packets. If these three conditions are met, the process continues to s555, at which a "CTSPresent" flag is set in Packet N before the process proceeds to s570, at which Packet N (containing the "CTSPresent" flag as an indication that its associated "CTS" packet has been identified) is written and can be uploaded as part of the updated, shortened packet capture.

If however it is found at s550 that not all three conditions are met, the process continues to s560, at which Packet N (not containing a "CTSPresent" flag) is written, then to s565, at which Packet N+1 is written, so that both (unchanged) packets can be uploaded as part of the packet capture.

After one of s535, s565 or s570 has been performed, the process returns to s500 and performs corresponding actions in respect of the next packet of a packet capture of local area network diagnostic data obtained in respect of the LAN, now referring to this next packet as "Packet N".

Figure 6:
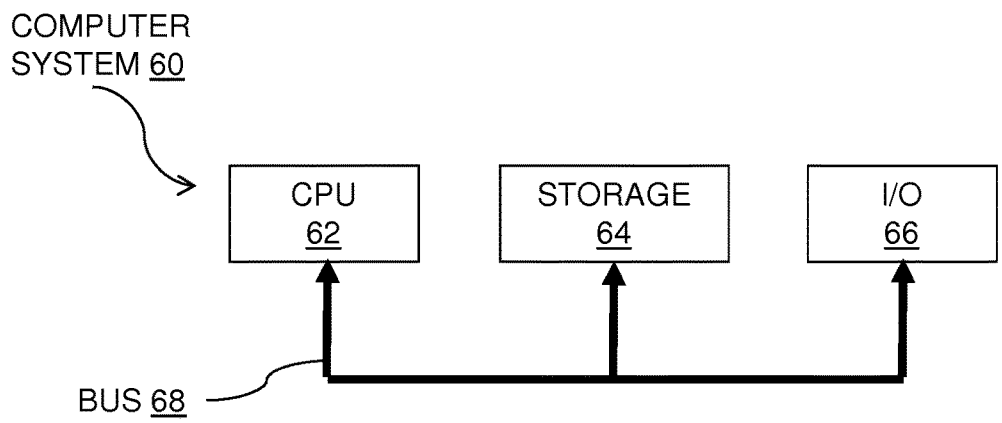
FIG. 6 is a diagram of a computer system suitable for the operation of embodiments of the disclosure or components thereof.

FIG. 6 is a diagram of a computer system 60 suitable for the operation of embodiments of the disclosure or components thereof. A central processor unit (CPU) 62 is communicatively connected to a data store 64 and an input/output (I/O) interface 66 via a data bus 68. The data store 64 can be any read/write storage device or combination of devices such as a random access memory (RAM) or a non-volatile storage device, and can be used for storing executable and/or non-executable data. Examples of non-volatile storage devices include disk or tape storage devices. The I/O interface 66 is an interface to devices for the input and/or output of data. Examples of I/O devices connectable to I/O interface 66 include a keyboard, a mouse, a display (such as a monitor) and a network connection.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure.

The scope of the disclosure may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of processing local area network diagnostic data obtained in respect of a local area network, the local area network having at least one user-device located therein operable to communicate via a local area network gateway device with one or more remote devices in a communications network outside the local area network, the local area network diagnostic data comprising one or more sets of data units carrying data relating to performance characteristics in respect of communication between the local area network gateway device and the at least one user-device located in the local area network, each set of data units comprising at least a first data unit and an associated second data unit having a predetermined relationship, the method comprising:

identifying, from the local area network diagnostic data obtained in respect of the local area network, a set of data units from the one or more sets of data units, comprising a first data unit and an associated second data unit having a predetermined relationship;

updating the first data unit of the set to include an indication that the associated second data unit of the set has been identified; and sending the updated first data unit without the associated second data unit having been sent from the local area network for local area network performance analysis at a remote network diagnostic device in the communications network outside the local area network.

2. A method according to claim 1 wherein the local area network diagnostic data obtained in respect of the local area network comprises a plurality of packets conforming to a predetermined version of a network protocol.

3. A method according to claim 1 wherein the local area network diagnostic data obtained in respect of the local area network comprises a plurality of packets conforming to a predetermined wireless networking protocol.

4. A method according to claim 1 wherein the local area network diagnostic data comprises one or more of the following:

at least one Request-To-Send (RTS) packet and at least one associated Clear-To-Send (CTS) packet;

at least one Data packet and at least one associated Acknowledgement (ACK) packet; or at least one Management packet and at least one associated ACK packet.

5. A method according to claim 4 wherein one or more of the following is identified as a set of data units:

an RTS packet and an associated CTS packet;

a Data packet and an associated ACK packet; or a Management packet and an associated ACK packet.

6. A method according to claim 1 wherein the local area network diagnostic data comprises a plurality of sets of data units carrying data relating to performance characteristics of the local area network, each set of data units comprising at least a first data unit and an associated second data unit having a predetermined relationship.

7. A method according to claim 6 wherein the method further comprises: identifying from the local area network diagnostic data a plurality of sets of data units, each set comprising a first data unit and an associated second data unit having a predetermined relationship; updating the first data unit of each set to include an indication that the associated second data unit of the set has been identified; and sending updated local area network diagnostic data from the local area network for local area network performance analysis at a remote network diagnostic device in the communications network outside the local area network, the updated local area network diagnostic data comprising the updated first data unit of each set without the associated second data unit of the set.

8. A method according to claim 1 wherein the data units include respective time indications and are identified as comprising a set of data units in dependence on their respective time indications.

9. A method according to claim 1 wherein the data units include respective indications of type and are identified as comprising a set of data units in dependence on their respective indications of type.

10. A method according to claim 1 wherein the method further comprises: receiving the updated first data unit at the remote network diagnostic device; inspecting the updated first data unit; and in response to identifying the indication therein that the associated second data unit of the set has been identified, generating a data unit corresponding to the associated second data unit.

11. A method according to claim 10 wherein the method further comprises performing local area network performance analysis at the remote network diagnostic device in dependence on the received first data unit and on the generated data unit corresponding to the associated second data unit.

12. An apparatus for processing local area network diagnostic data obtained in respect of a local area network, the local area network having at least one user-device located therein operable to communicate via a local area network gateway device with one or more remote devices in a communications network outside the local area network, the local area network diagnostic data comprising one or more sets of data units carrying data relating to performance characteristics in respect of communication between the local area network gateway device and the at least one user-device located in the local area network, each set of data units comprising at least a first data unit and an associated second data unit having a predetermined relationship, the apparatus comprising:

one or more processors configured to:
identify, from the local area network diagnostic data obtained in respect of the local area network, a set of data units from the one or more sets of data units, comprising a first data unit and an associated second data unit having a predetermined relationship;

update the first data unit of the set to include an indication that the associated second data unit of the set has been identified; and send the updated first data unit without the associated second data unit having been sent from the local area network for local area network performance analysis at a remote network diagnostic device in the communications network outside the local area network.

13. The apparatus according to claim 12, further comprising one or more modules in or associated with the local area network gateway device.

14. A non-transitory computer-readable storage medium storing a computer program element comprising computer program code to, when loaded into a computer system and executed thereon, cause the computer system process local area network diagnostic data obtained in respect of a local area network, the local area network having at least one user-device located therein operable to communicate via a local area network gateway device with one or more remote devices in a communications network outside the local area network, the local area network diagnostic data comprising one or more sets of data units carrying data relating to performance characteristics in respect of communication between the local area network gateway device and the at least one user-device located in the local area network, each set of data units comprising at least a first data unit and an associated second data unit having a predetermined relationship, comprising:

identifying, from the local area network diagnostic data obtained in respect of the local area network, a set of data units from the one or more sets of data units, comprising a first data unit and an associated second data unit having a predetermined relationship;

updating the first data unit of the set to include an indication that the associated second data unit of the set has been identified; and sending the updated first data unit without the associated second data unit having been sent from the local area network for local area network performance analysis at a remote network diagnostic device in the communications network outside the local area network.

* * * * *